(12) United States Patent
Jia (10) Patent No.: US 8,306,121 B2
(45) Date of Patent: Nov. 6, 2012

(54) METHOD AND APPARATUS FOR SUPER-RESOLUTION OF IMAGES

(75) Inventor: Yunwei Jia, Thornhill (CA)

(73) Assignee: ATI Technologies ULC, Markham, Ontario (CA)

( * ) Notice: Subject to any disclaimer, the term of this patent is extended or adjusted under 35 U.S.C. 154(b) by 1263 days.

(21) Appl. No.: 12/076,347

(22) Filed: Mar. 17, 2008

(65) Prior Publication Data

US 2009/0232213 A1      Sep. 17, 2009

(51) Int. Cl.
*H04N 7/12* (2006.01)
(52) U.S. Cl. ................................. 375/240.16
(58) Field of Classification Search .................... None
See application file for complete search history.

(56) References Cited

U.S. PATENT DOCUMENTS

| | | | | |
|---|---|---|---|---|
| 5,696,848 | A * | 12/1997 | Patti et al. | 382/254 |
| 7,215,831 | B2 * | 5/2007 | Altunbasak et al. | 382/299 |
| 7,420,592 | B2 * | 9/2008 | Freeman | 348/219.1 |
| 7,477,802 | B2 * | 1/2009 | Milanfar et al. | 382/299 |
| 7,515,747 | B2 * | 4/2009 | Okutomi et al. | 382/167 |
| 7,764,848 | B2 * | 7/2010 | Ida et al. | 382/299 |
| 7,876,477 | B2 * | 1/2011 | Toma et al. | 358/474 |
| 7,974,498 | B2 * | 7/2011 | Ben-Ezra et al. | 382/299 |
| 8,036,488 | B2 * | 10/2011 | Nagumo | 382/275 |
| 8,036,494 | B2 * | 10/2011 | Chen | 382/299 |
| 8,041,151 | B2 * | 10/2011 | Tanaka et al. | 382/299 |
| 2004/0151401 | A1 * | 8/2004 | Sawhney et al. | 382/299 |
| 2005/0019000 | A1 * | 1/2005 | Lim et al. | 386/46 |
| 2005/0219642 | A1 * | 10/2005 | Yachida et al. | 358/448 |
| 2005/0232514 | A1 * | 10/2005 | Chen | 382/298 |
| 2006/0038891 | A1 * | 2/2006 | Okutomi et al. | 348/222.1 |
| 2006/0126952 | A1 * | 6/2006 | Suzuki et al. | 382/233 |
| 2006/0188019 | A1 * | 8/2006 | Lin | 375/240.16 |
| 2006/0274958 | A1 * | 12/2006 | Lopez et al. | 382/240 |
| 2006/0290711 | A1 * | 12/2006 | Milanfar et al. | 345/606 |
| 2007/0071104 | A1 * | 3/2007 | Kondo | 375/240.21 |
| 2007/0071362 | A1 * | 3/2007 | Milanfar et al. | 382/299 |
| 2007/0217713 | A1 * | 9/2007 | Milanfar et al. | 382/299 |
| 2007/0285500 | A1 * | 12/2007 | Ma et al. | 348/14.07 |

(Continued)

FOREIGN PATENT DOCUMENTS

JP            07-162868            6/1995

(Continued)

OTHER PUBLICATIONS

Park et al., "Super-Resolution Image Reconstruction: A Technical Overview", IEEE Signal Processing Magazine, May 2003, pp. 21-36.

(Continued)

*Primary Examiner* — Phirin Sam
*Assistant Examiner* — Faiyazkhan Ghafoerkhan
(74) *Attorney, Agent, or Firm* — Sterne, Kessler, Goldstein & Fox P.L.L.C.

(57) ABSTRACT

A method to generate super-resolution images using a sequence of low resolution images is disclosed. The method includes generating an estimated high resolution image, motion estimating between the estimated high resolution image and comparison images from the sequence of low resolution images, motion-compensated back projecting, and motion-free back projecting that results in a super resolved image. A corresponding system for generating super-resolution images includes a high resolution image estimation module, a motion estimating module, a motion-compensated back projection module, a motion-free back projection module, an input interface, and an output interface.

14 Claims, 9 Drawing Sheets

U.S. PATENT DOCUMENTS

| | | | |
|---|---|---|---|
| 2008/0002239 A1* | 1/2008 | Toma et al. | 358/474 |
| 2008/0018788 A1* | 1/2008 | Zhou et al. | 348/452 |
| 2008/0181311 A1* | 7/2008 | Zhang et al. | 375/240.24 |
| 2008/0260279 A1* | 10/2008 | Volovelsky et al. | 382/254 |
| 2009/0010568 A1* | 1/2009 | Nakagami et al. | 382/299 |
| 2009/0046952 A1* | 2/2009 | Ben-Ezra et al. | 382/299 |
| 2009/0092337 A1* | 4/2009 | Nagumo | 382/299 |

FOREIGN PATENT DOCUMENTS

| | | |
|---|---|---|
| JP | 07-288817 | 10/1995 |
| JP | 2006-033141 | 2/2006 |
| JP | 2007-052672 | 3/2007 |

OTHER PUBLICATIONS

Farsiu et al., "Advances and Challenges in Super-Resolution", Wiley Periodicals, Inc., vol. 14, 2004, pp. 47-57.

Peleg et al., "Improving Image Resolution Using Subpixel Motion", Pattern Recognition Letters 5, vol. 5, No. 3, Mar. 1987, pp. 223-226.

Keren et al., "Image Sequence Enhancement Using Sub-pixel Displacements", Dept. of Computer Science, The Hebrew University of Jerusalem, IEEE, 1988, pp. 742-746.

Capel, et al., "Super-Resolution from Multiple Views Using Learnt Image Models", Robotics Research Group, Dept. of Engineering Science, University of Oxford, IEEE, 2001, pp. 627-634.

Schultz, et al., "A Bayesian Approach to Image Expansion for Improved Definition", IEEE Transactions on Image Processing, vol. 3, No. 3, May 1994, pp. 233-242.

Stark, et al., "High-Resolution Image Recovery from Image-Plane Arrays, Using Convex Projections", Optical Society of America, vol. 6, No. 11, 1989, pp. 1715-1726.

The International Search Report cited in International Application No. PCT/IB2009/000508, dated May 6, 2009, 4 pages.

The Written Opinion of the International Searching Authority cited in International Application No. PCT/IB2009/000508, dated May 6, 2009, 4 pages.

Farsiu et al., "Advances and Challenges in Super-Resolution," Int'l Journal of Imaging Systems and Technology, vol. 4, No. 2, Aug. 2002, pp. 47-57.

Freeman et al., "Example-Based Super-Resolution," Image-Based Modeling, Rendering, and Lighting, IEEE Computer Graphics and Applications, Mar./Apr. 2002, pp. 56-65.

Koo et al., "An Image Resolution Enhancing Technique Using Adaptive Sub-Pixel Interpolation For Digital Still Camera System," IEEE Transactions on Consumer Electronics, vol. 45, No. 1, Feb. 1999, pp. 118-123.

English language Abstract of Japanese Patent Publication No. 2007-052672, published Mar. 1, 2007 (1 page).

English language Abstract of Japanese Patent Publication No. 2006-033141, published Feb. 2, 2006 (1 page).

English language Abstract of Japanese Patent Publication No. 07-288817, published Oct. 31, 1995 (1 page).

English language Abstract of Japanese Patent Publication No. 07-162868, published Jun. 23, 1995 (1 page).

* cited by examiner

```
if        sp ≥ 1 && sad<nact*4/4        λ = 1;
                       else if  sp ≥ 2 && sad<nact*6/4
    λ = 1/2;
else if   sp ≥ 3 && sad<nact*8/4        λ = 1/4;
else if   sp ≥ 4 && sad<nact*10/4       λ = 1/8;
else if   sp ≥ 5 && sad<nact*12/4       λ = 1/16;
else                                    λ = 0;

if   z' co-sites an existing pixel in LR(n) λ = λ/2;
```

METHOD AND APPARATUS FOR SUPER-RESOLUTION OF IMAGES

BACKGROUND

1. Field of Invention

The present invention relates generally to super-resolution of images.

2. Related Art

Many applications, for example, such as high-definition television, forensic imaging, surveillance imaging, satellite imaging, medical and scientific imaging, use increasing amounts of resolution with great benefit. The effort to achieve ever increasing resolution in images runs into issues of cost and complexity in required optics and electronics. Also, reducing the pixel size in a sensor in order to increase the pixel density of an image, increases the effect of shot noise due to the lower amounts of light available per pixel.

By way of background, a video signal is a continuous flow of image frames. Each frame captures a temporal instant of a particular scene. The image frames may also have spatial differences between them, either due to motion of the camera or motion in a scene that is captured. Each image, for example, such as a low resolution (LR) image, is a representation of a scene with generally a substantial amount of noise. The noise may be due to information lost in image capture, such as low resolution imaging and other forms of electronic, or optical, noise that contribute to the general reduction in correspondence between the image and the actual scene.

Resolution enhancing techniques that use spatial interpolation—for example, bi-linear filtering, bi-cubic filtering, and poly-phase filtering—derive additional pixels for the high resolution (HR) image frame using the pixels of one low resolution image frame. The use of pixels in a single image frame to derive additional pixels for the high resolution image, generally results in a blurred image. For example, in bi-linear filtering, two adjacent pixels may be averaged to yield the value of a new pixel to be inserted between them: the new pixel being an average value of the two original pixels is likely to introduce some blurriness to the image.

Super-resolution of video signals is a technique by which an input video frame sequence at a low spatial resolution is transformed to an output video frame sequence of high spatial resolution through image processing. In contrast to spatial interpolation techniques, information from multiple low resolution frames are used to develop the high resolution frame. The use of multiple low resolution frame images gives super-resolution he ability to produce high resolution images with details not available in a single low resolution image. These high resolution images have more spatial detail, sharper edges, fewer artifacts such as blurring and aliasing, and less noticeable noise.

Super-resolution can be formulated as the inversion problem shown mathematically in equation (1). Equation (1) represents that an observed sequence of low resolution images of a scene, is derived from a high resolution image of the scene being effected by imaging process noise and additive random noise.

$$Y = HX + N \quad (1),$$

where X represents the unknown high resolution image, Y represents the observed low resolution image, H is the system matrix of the imaging process, and N is the random additive noise. H represents the natural loss of spatial resolution caused, for example, due to optical distortions, motion blur, noise within the optics or electronics, noise introduced in transmission of the image, and insufficient sensor density. In super-resolution, generally, the objective is to find an estimate of the corresponding high resolution image X, from a set of observed images Y.

Several techniques are described in the art for super-resolution. Good overviews are provided in, Park, S. C., Park, M. K., and Kang, M. G., "Super-resolution Image Reconstruction: a technical overview," IEEE Signal Processing Magazine, 20(3):21-36, May 2003; and Farsiu, S., Robinson, D., Elad, M., and Magazine, P., "Advances and Challenges in Super-Resolution," International Journal of Imaging Systems and Technology, vol. 14, no. 2, pp. 47-57, August 2004. In general, super-resolution techniques can be categorized as either motion-based or motion-free. In motion-based techniques the attempt is to track an object in multiple low resolution images and then combine these spatially shifted versions of the object into a high resolution image of the object. In motion-free methods, one uses cues such as known corresponding samples of low resolution and high resolution images and edges to obtain high resolution details.

Motion-free techniques, such as the frequency-domain methods described in Tsai, R., and Huang, T., "Multiframe Image Restoration and Registration," Advances in Computer Vision and Image Processing, vol. 5, issue 3, pp. 223-226, March 1987, rely oil global motion between low resolution frames. Other motion-free techniques, such as the learning-based methods described in Kepel, D., and Zisserman, A., "Super-resolution from multiple views using learnt image models," Proc. IEEE Conference on Computer Vision and Pattern Recognition, pp. 627-634, December 2001, require the development of an extensive database of mappings between low resolution and corresponding high resolution images.

Motion-based techniques that are described in the art include non-uniform sampling methods described in Keren, D., Peleg, S., and Brada, R., "Image Sequence Enhancement Using Subpixel Displacements," Proc. IEEE Computer Society Conference on Computer Vision and Pattern Recognition, pp. 742-746, June 1998; projection onto convex sets (POCS) methods described in Stark, H., and Oskoui, P., "High-resolution image recovery from image-plane arrays using convex projections," Journal of the Optical Society of America, A: Optics and Image Science, vol. 6, pp. 1715-1726, November 1989; bayesian methods described in Schultz, R., and Stevenson, R., "A Bayesian Approach to Image Expansion for Improved Definition," IEEE Transactions on Image Processing, vol. 3, no. 3, pp. 233-242, May 1994; and, iterative back projection (IBP) methods or simulate-and-correct methods described in Peleg, S., Keren, D., and Schweitzer, D., "Improving Image Resolution by Using subpixel Motion," Pattern Recognition Letters, vol. 5, issue 3, pp. 223-226, March 1987. Each one of these methods require a high level of computational complexity. In addition, POCS may require a-priori knowledge of some of the characteristics of the high resolution image, and bayesian methods may require a probability model that accurately describes the high resolution image.

What is needed, therefore, is a method of super-resolution imaging that is of reduced computational complexity that does not require a-priori knowledge of the desired high resolution image.

BRIEF SUMMARY OF THE INVENTION

In one embodiment, the present invention is a computer-implemented method to generate super-resolution images using a sequence of low resolution images. The method includes: generating a first estimated high resolution image corresponding to a first low resolution image selected from a received sequence of low resolution images; motion estimating between the first estimated high resolution image and comparison images from the sequence of low resolution images generating motion estimation results of the first estimated high resolution image; motion-compensated back projecting of the first estimated high resolution image generating a second estimated high resolution image; motion-free back projecting of the second estimated high resolution image resulting in a First super resolved image; and outputting the first super resolved image.

Another embodiment of the present invention is a system for generating super-resolution images, that includes: a high resolution image estimation module; a motion estimating module; a motion-compensated back projection module; a motion-free back projection module; an input interface; and an output interface. A sequence of low resolution images received at the input interface, is processed in sequence in the high resolution estimation module, the motion estimating module, the motion-compensated back projection module, and motion-free back projection module, and the resulting high resolution image is transmitted through an output interface.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated in and constitute part of the specification, illustrate embodiments of the invention and, together with the general description given above and the detailed description of the embodiment given below, serve to explain the principles of the present invention. In the drawings.

DETAILED DESCRIPTION

While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

It would be apparent to one of skill in the art that the present invention, as described below, may be implemented in many different embodiments of software (which may include hardware description language code), hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

One embodiment of the present invention is a method for super-resolution of video, as described below. A person skilled in the art will recognize that the teachings provided herein may be applied to super-resolution of other media, for example, still images. The input to the super-resolution process, for example, super-resolution of video, is a sequence of low resolution images (or inter-changeably, frames) LR(0), LR(1), . . . , each of which has a spatial resolution of in_size_H×in_size_V. The dimensions in_size_H×in_size_V are herein referred to as low resolution. The output of the super-resolution process is a sequence of images SR(0), SR(1), . . . , each of which has a spatial resolution of out_size_H×out_size_V, herein referred to as high resolution.

Figure 1:
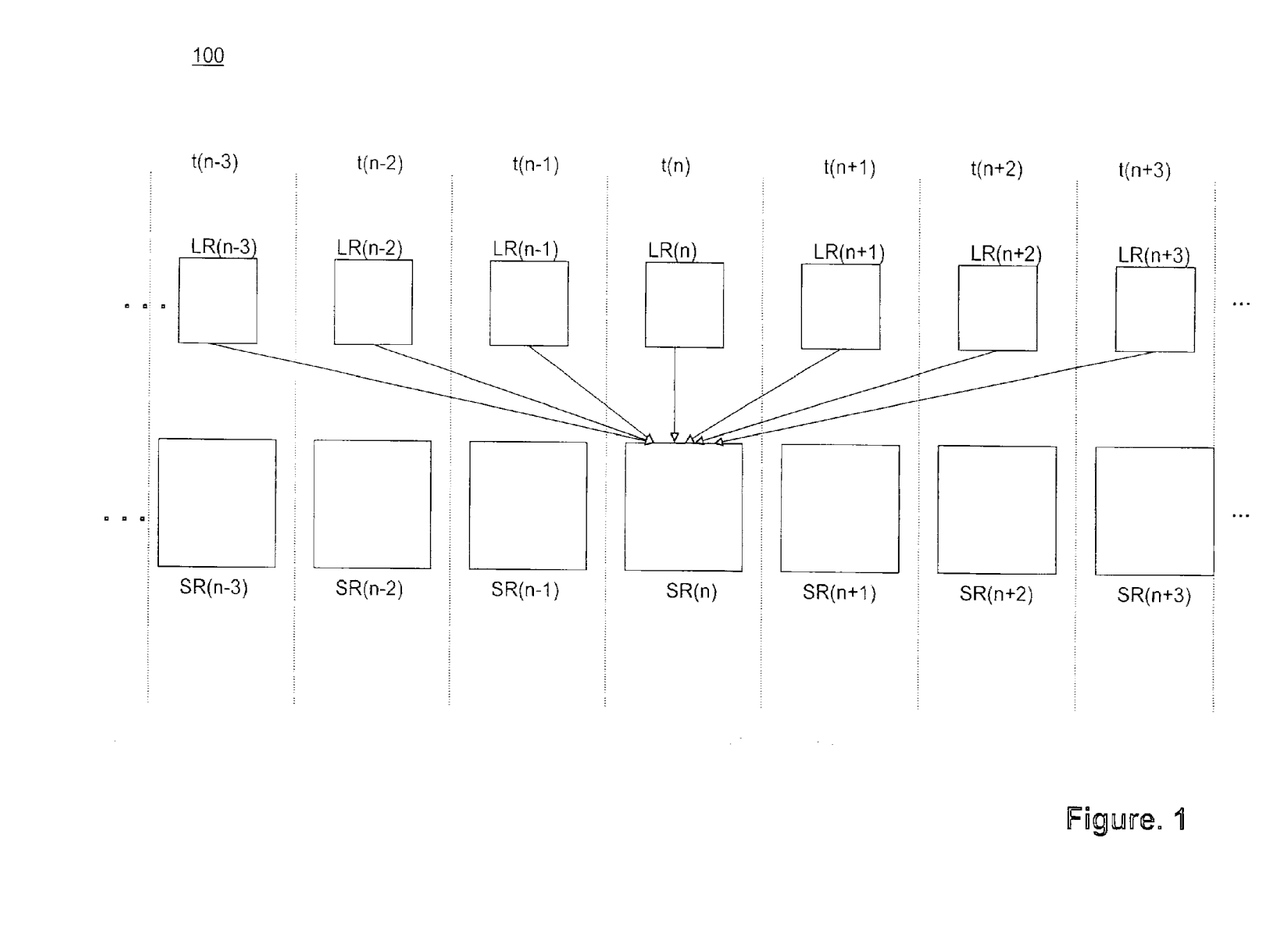
FIG. 1 is an illustration, in an embodiment, of the temporal relationship between low resolution frames and output high resolution super-resolved frames, where the process frame window is 7 frames.

FIG. 1 is an illustration 100 of the temporal relationship between low resolution frames and output high resolution super-resolved frames, in accordance with an embodiment of the present invention. In the exemplary illustration 100, the process frame window is 7 frames. In FIG. 1, an output high resolution image SR(n) may have the same temporal position t(n) in a sequence of output images, as an input low resolution image LR(n) in a sequence of input images.

To produce the high resolution image SR(n), it is generally beneficial to utilize the information not only from LR(n) but also from a number of its adjacent images, for example, LR(n−3), LR(n−2), LR(n−1), LR(n+1), LR(n+2), and LR(n+3) corresponding to the LR images in temporal slots t(n−3) . . . t(n+3), as shown in FIG. 1.

More specifically, in FIG. 1, a set of seven low resolution frames, hereafter referred to as the processing frame window of SR(n), may be used in producing a high resolution frame SR(n). The processing frame window size may be predetermined, or dynamically determined in an implementation based on characteristics of the incoming image sequences. The low resolution images used in producing SR(n) are LR(n−3) . . . LR(n+3). Although a processing frame window of seven frames is used herein for purposes of illustration, it should be noted that other embodiments of the invention may use different numbers of low resolution frames and/or a different temporal configurations of the frames to meet various constraints, for example, visual quality, complexity and delay, repeated frames, etc. that may be relevant to different applications.

For purposes of illustration. The present invention is described in terms of a high resolution frame SR(n) generated in correspondence to a low resolution frame LR(n). In an overview of this process, an initially estimated high resolution frame PP(n) of the targeted spatial resolution out_size_H×out_size_V is generated from LR(n) using, for example, spatial interpolation. Next, motion estimation (ME) is performed between the frame PP(n) and each of the six frames SR(n−3), SR(n−2), SR(n−1), PP(n+1), PP(n+2), and PP(n+3), where SR(n−3), SR(n−2) and SR(n−1) are high resolution frames having previously completed the conversion to super-resolution, corresponding to LR(n−3), LR(n−2) and LR(n−1), respectively; and PP(n+1), PP(n+2), and PP(n+3) are the output high resolution frames from the spatial interpolation for LR(n+1), LR(n+2), and LR(n+3), respectively.

Next, for each pixel in LR(n+k) (k=−3, −2, −1, 1, 2, 3), the corresponding pixels in PP(n) are identified via the motion estimation results and a programmable neighborhood window. These high resolution pixels are then updated according to their consistency level with the corresponding low resolution pixel of LR(n+k). The pixels in the low resolution frame LR(n) are used to adjust the pixels in the high resolution image obtained from the previous processing block, and the output is the final high resolution image SR(n), also referred to herein as the super resolved image. Each major processing step in achieving super-resolution video according to an embodiment of the present invention, is explained in detail below.

Generation of an Initially Estimated High Resolution Image

Figure 2:
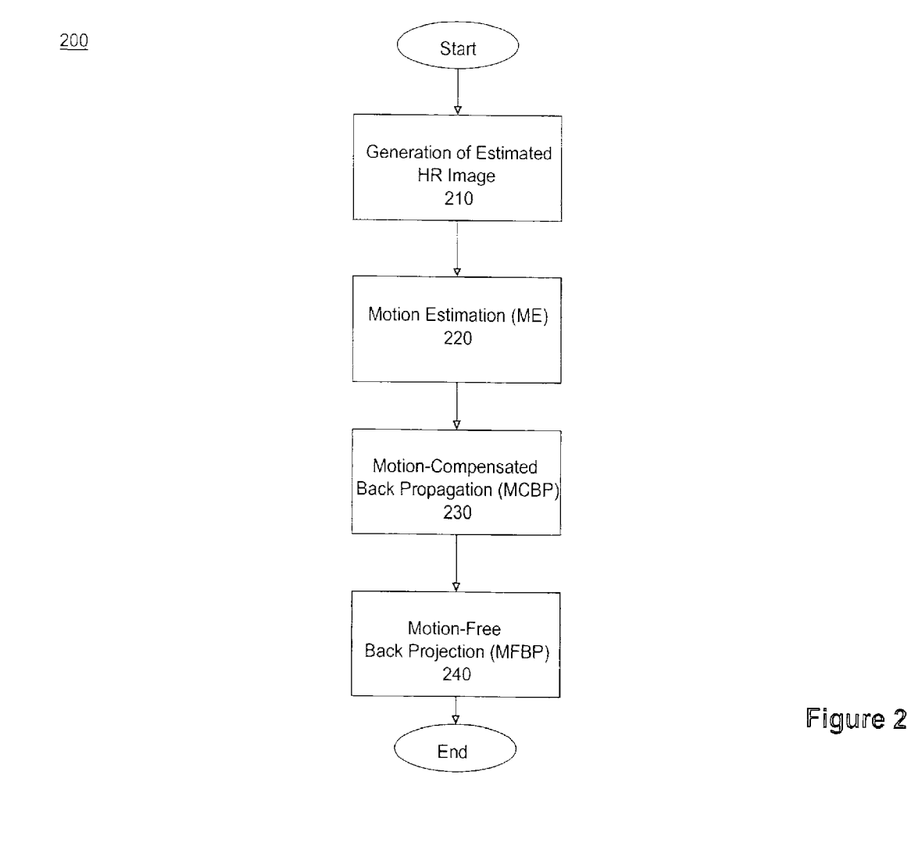
FIG. 2 is a flowchart of the major processing blocks of the present invention according to an embodiment.

FIG. 2 is a flowchart 200 of the major processing blocks in an embodiment of the present invention. In processing block 210, the low resolution image LR(n) is used to generate a corresponding initially estimated high resolution image PP(n) having dimensions desired of the corresponding super resolved image SR(n). By way of background, spatial interpolation is a method well known in the art for generating a high resolution image from a single low resolution image: for example, bi-cubic filtering and poly-phase filtering are spatial resolution methods that may be used. The input to generating an initially estimated high resolution image is a low resolution image LR(n); and the output is a up-scaled image PP(n) having the target resolution out_size_H×out_size_V. For example, LR(n) may be spatially up-scaled to result in PP(n) using spatial interpolation. PP(n) is the initial estimate of the super resolved image SR(n).

Motion Estimation

Subsequent to the generation of PP(n), in processing block 220, motion estimation results of PP(n) are generated with respect to each of the other temporal slots in SR(n)'s processing frame window.

Motion vectors are created between PP(n), and a corresponding high resolution image for each time slot preceding LR(n) within its processing frame window. For example, assuming a processing frame window of seven frames, motion vectors can be developed between PP(n) and each high resolution image SR(n−1), SR(n−2) and SR(n−3), where SR(n−1) . . . SR(n−3) are super resolved images corresponding to low resolution images LR(n−1) . . . LR(n−3) respectively. In some embodiments, intermediate high resolution images PP(n−1), PP(n−2), and PP(n−3) may be used in place of SR(n−1), SR(n−2) and SR(n−3), respectively. It should be noted however, that the use of SR(n−1), . . . SR(n−3), may be advantageous with respect to motion accuracy and computing complexity.

As described herein the implementation would require holding, for example buffering, the respective high resolution images so that they are available for use in generating SR(n). Motion vectors may also be developed between PP(n) and a corresponding high resolution image for each one of the time slots within the processing frame window that follow LR(n), for example, PP(n+1), PP(n+2) and PP(n+3). Note that PP(n+1) . . . PP(n+3) are the initially estimated high resolution images corresponding to LR(n+1) . . . LR(n+3) respectively. A person skilled in the art will understand that some form of pipelininig of incoming image frames in the several processing blocks, shown in FIG. 2, may be required. For example, in one embodiment, initial high resolution estimates of LR(n+1) . . . LR(n+2) should be available when PP(n) is being processed in the motion estimation block 220.

In processing color images, for example, motion estimation may be conducted in YUV domain using all three components. For purposes of reducing computational complexity, motion estimation may use only luminance samples. Frames in RGB format may be converted to YUV format prior to processing for motion estimation.

The outputs of the motion estimation block may be denoted as MER(n+k, n) (k=−3, −2, −1, 1, 2, 3) for the motion estimation results between PP(n) and each of the frames SR(n−3), SR(n−2), SR(n−1), PP(n+1), PP(n+2), PP(n+3). In motion estimation between a air of frames, one frame is used as anchor and is referred to as "reference frame" $F_r$, and the search is conducted in the other frame which is referred to as "target frame" $F_t$. Herein, we use the notation MER(r, t) to represent the motion estimation results between $F_r$ and $F_t$ with $F_r$ as reference frame and $F_t$ as target frame. For example, MER(n−3, n) represents the motion estimation results where SR(n−3) is the reference frame and PP(n) is the target frame.

The format of MER(n+k, n) is described using k=−3 as an example. Consider a partition of the reference frame SR(n−3) where the pixels in SR(n−3) are partitioned into non-overlapping blocks of size block_size_H×block_size_V, where block_size_H is the number of pixels horizontally in a block and block_size_V is the number of pixels vertically. For a block R in SR(n−3) with its top-left pixel at location (bx*block_size_H. by*block_size_V), its motion estimation result is recorded as an element MER(n−3, n, bx, by) in MER(n−3, n). MER(n−3, n, bx, by) may comprise of four data items: MVx, the horizontal component of the motion vector; MVy;, the vertical component of the motion vector; sad, the sum-of-absolute differences for the motion vector; and act, the activity of the block.

If (MVx, MVy) is the motion vector of blocks R and T, then block R at (bx* block_size_H, by*block_size_V) in the reference frame SR(n−3) matches with the block T at (bx*block_size_H−MVx, by*block_size_V−MVy) in the target frame PP(n). Both MVx and MVy are integers. The integer-precision of the motion vector in high resolution implies a sub-pixel precision in low resolution. The data item sad represents the "Sum of Absolute Differences" (SAD) between the pixels in R and the pixels in T. The data item act is a measure of the activity of the block R, which is defined as the sum of the absolute differences between two neighboring pixels of R, both horizontally and vertically. For example, if the block size is 4×4 pixels, the sad between R and T may be defined as in Equation 2:

$$\text{sad} = \sum_{i=1}^{4} \sum_{j=1}^{4} |R_{i,j} - T_{i,j}| \qquad (2)$$

and act of R may be defined as in Equation 3:

$$\text{act} = \sum_{i=1}^{3} \sum_{j=1}^{4} |R_{i,j} - R_{i+1,j}| + \sum_{i=1}^{4} \sum_{j=1}^{3} |R_{i,j} - R_{i,j+1}| \qquad (3)$$

$R_{i,j}$ refers to the i,j pixel of R, and likewise $T_{i,j}$ refers to the i,j pixel of T. Block R is a rectangular area with a top-left pixel of $R_{0,0}$ and a bottom right pixel of $R_{3,3}$, likewise block T is a rectangular area with a top-left pixel of $T_{0,0}$ and a bottom right pixel of $T_{3,3}$. Equations (2) and (3) are indicative of the fact that the pixels surrounding R and T may also be used in the computation of sad and act. The activity of a block may be used to evaluate the reliability of corresponding motion estimation results. To accurately reflect reliability, act may have to be normalized against the corresponding SAD in terms of the number of absolute pixel differences, as shown below in Equation 4:

$$nact = \frac{act * num\_pixels\_in\_sad}{num\_pixels\_in\_act} \quad (4)$$

where num_pixels_in_sad is the number of absolute pixel differences in the calculation of sad, and num_pixels_in_act is that of act, respectively. The terms nact is the normalized activity of the block. Note that the surrounding pixels of R and T may be used in calculating sad and act as well.

Motion Estimation: Procedures

A number of methods may be used in motion estimation. In an embodiment of the resent invention, motion estimation is performed in three stages, as illustrated in FIG. 3.

Figure 3:
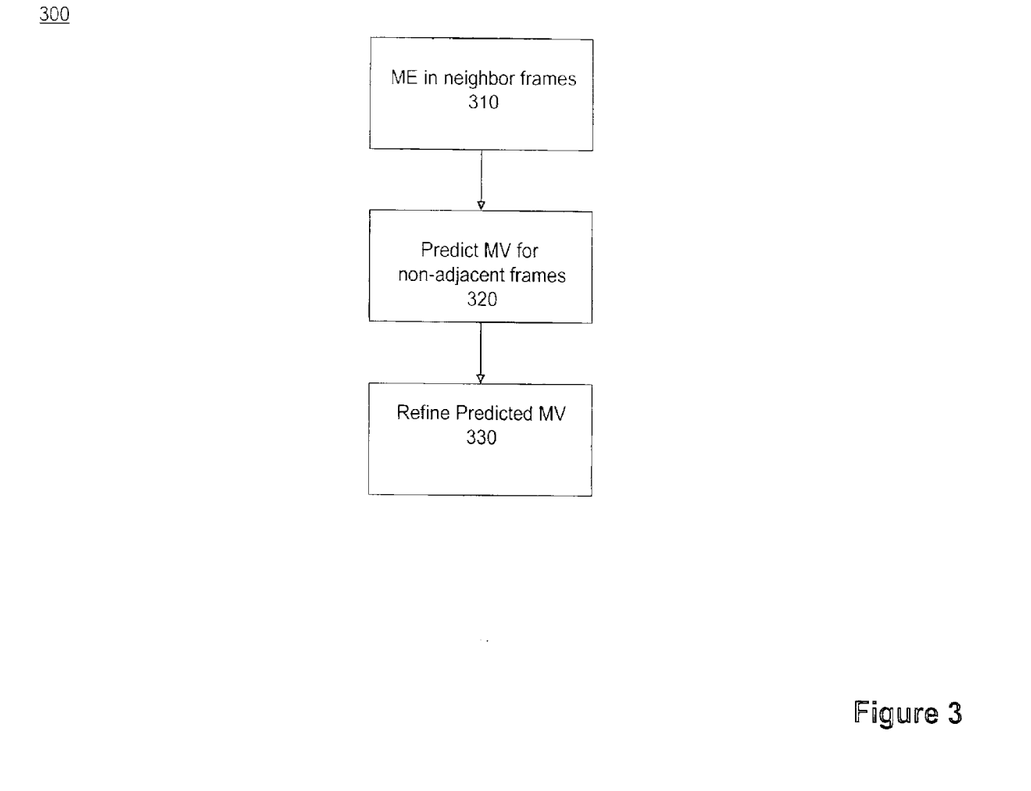
FIG. 3 is a flowchart of the stages in the motion estimation processing block of FIG. 2.

FIG. 3 is a flowchart of the stages in the motion estimation processing block. In a first stage 310, motion estimation is performed between neighboring high resolution frames within location (0, 0) as search center. For example, motion search for a block in the reference frame is conducted around the co-located block in the target frame. In a second stage 320, the motion vectors between PP(n) and its non-adjacent frames are predicted from the available motion vectors. In a final stage 330, motion estimation is performed for non-adjacent frames with the predicted motion vectors as search centers.

Figure 4:
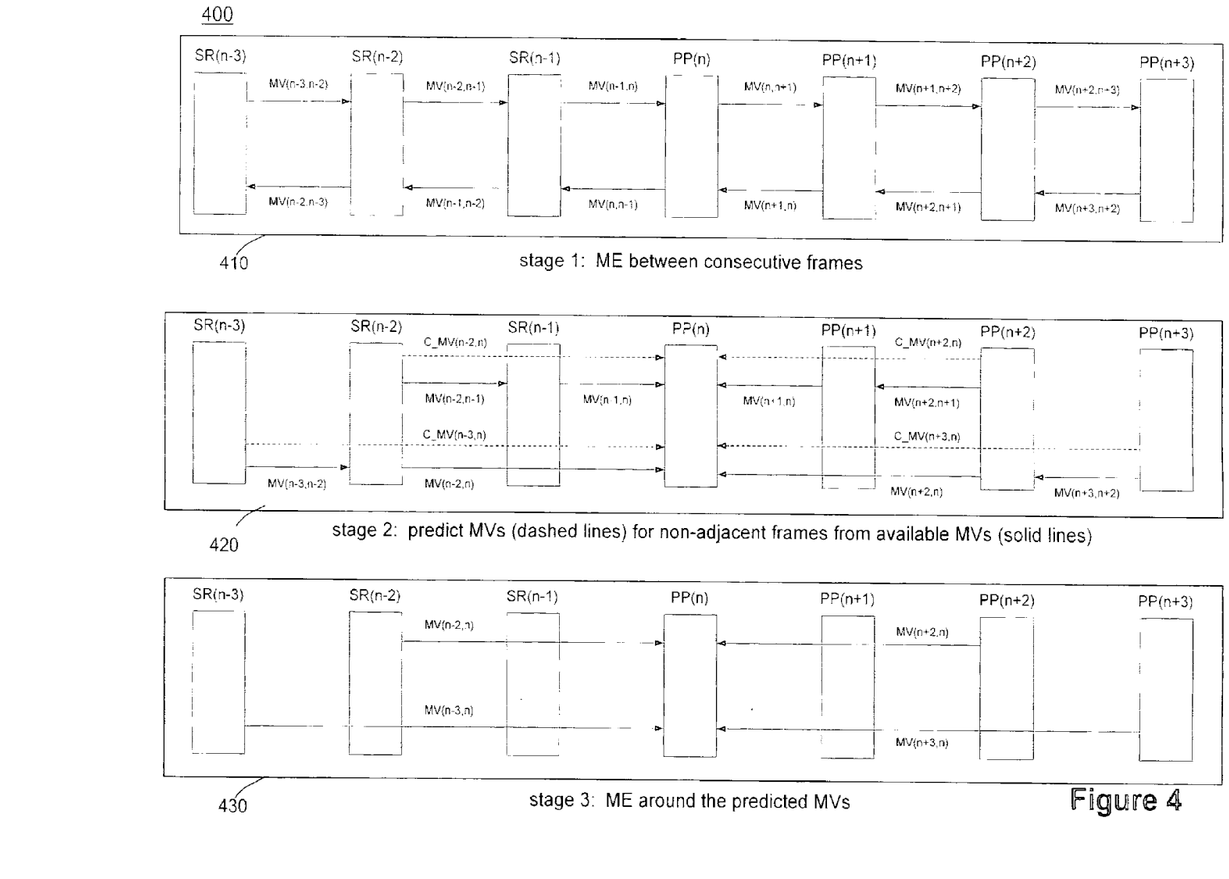
FIG. 4 shows more detail of the stages in motion estimation processing shown in FIG. 3, according to an embodiment with a process frame window of 7 frames.

FIG. 4 is an illustration of additional details of the three stage motion estimation process. The purpose of the proposed method of motion estimation using staged procedures is to achieve a large effective search area by covering small actual search areas in each motion estimation stage. This is especially useful when a large number of low resolution frames are used to generate a high resolution frame, since in that case, the motion between two non-adjacent frames may be relatively substantial. For example, locating a best matching block in a frame that is substantially distant in time, may require the search of a large frame area.

ME stage 1: In the first stage, details of which are shown in 410, motion estimation is performed between pairs of neighboring high resolution frames, for example, between SR(n−3) and SR(n−2), and between SR(n−2) and SR(n−1). For each pair of neighboring frames, two MEs are performed, one in the forward direction and another in the backward direction. For example, for the pair PP(n+2) and PP(n+3), motion estimation is performed in the forward direction with PP(n+2) as reference and PP(n+3) as target and MER(n+2, n+3) as the motion estimation result, and motion estimation is also performed in the reverse direction with PP(n+3) as reference and PP(n+2) as target and MER(n+3, n+2) as the motion estimation result. Motion estimation in this stage is based on full-search block matching, with (0, 0) as search center and a rectangular search area with horizontal dimension search_range_H and vertical dimension search_range_V.

The reference frame SR(n−3) is partitioned into non-overlapping blocks of size block_size_H×block_size_V. Next, for a block R in SR(n−3) with top-left pixel at (x, y), the corresponding search area is defined as the rectangular area in PP(n) delimited by the top-left position (x−search_range_H1/2, y−search_range_V1/2) and its bottom-right position (x+search_range_H1/2, y+search_range_V1/2), where search_range_H1 and search_range_V1 are programmable integers. Thereafter, in searching for the best-matching block in PP(n) for the block R in SR(n−3), R is compared with each of the blocks in PP(n) whose top-left pixel is included in the search area. The matching metric used in the comparison is the SAD between the pixels of block R and the pixels of each candidate block in PP(n). If, among all the candidate blocks in the search area, the block at the position (x', y') has the minimal SAD, then the motion vector (MV) for the block R is given by (MVx, MVy) where MVx=x−x', and MV=y−y'.

Note that at this stage in the processing of PP(n), except for MER(n+2, n+3) and MER(n+3, n+2), all other motion estimation results are available from previous processing due to pipelined processing of consecutive images. Thus, only motion estimates between PP(n+2) and PP(n+3) are required to be computed at this stage, provided the previous motion estimation results are properly buffered and ready to be used in the next two stages of motion estimation. After the first stage of motion estimation, the next two stages are preferably performed in the following order at frame level: first, stages 2 and 3 for SR(n−2) and PP(n+2), then stage 2 and 3 for SR(n−3) and PP(n+3). The reason for this ordering preference is described below.

ME stage 2: In this stage, details of which are shown in 420, the motion vectors between non-adjacent frames are predicted based on the available motion estimation results. The predicted motion vectors will be used as search centers in stage 3. For example, the predicted motion vectors between PP(n+2) as the reference frame and PP(n) as the target frame, can be represented as C_MV(n+2, n). To determine C_MV(n+2, n), MV(n+2, n+1) and MV(n+1, n) are combined, both being available from the previous stage of motion estimation processing.

Figure 5:
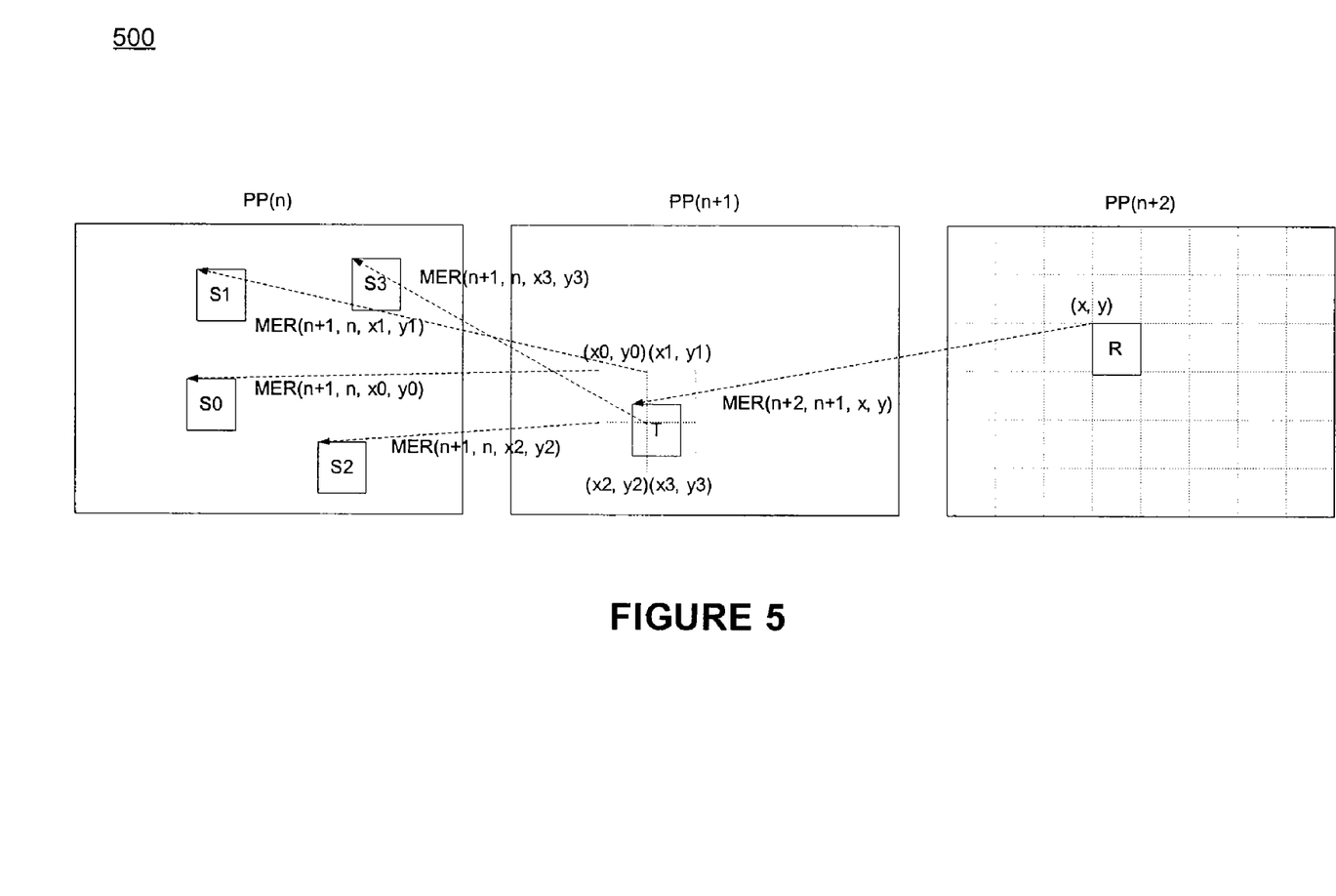
FIG. 5 illustrates a method, in another embodiment of the present invention, of computing motion vectors between non-neighboring images.

For example, as shown in FIG. 5, a block R at location (x, y) in PP(n+2) may have its best-matching block in PP(n+1) as block T, which is determined in the motion estimation between PP(n+2) as the reference frame and PP(n+1) as the target frame. Note that although R is aligned with the block grids, for example, x % block_size_H=0 and y % block_size_V=0, T may not be aligned with the block grid of its frame, and may be located anywhere in the search area. As illustrated in FIG. 5, block T may contain pixels from up to four grid-aligned blocks in PP(n+1) whose top-left pixels are at (x0, y0), (x1, y1), (x2, y2), and (x3, y3), respectively. Note that there cannot be more than four such blocks covered by T. In case of less than four grid-aligned blocks covered by T, some of the four top-left pixels overlap. The predicted motion vector for R from PP(n+2) to PP(n) may be set as the summation of the motion vectors for the block R from PP(n+2) to PP(n+1) and the median of the motion vectors for the block T from PP(n+1) to PP(n), as shown in Equation 5:

$$C\_MV(n+2,n,x,y)=MV(n+2,n+1,x,y)+\text{median}(MV(n+1,n,xi,yi), i=0,1,2,3) \quad (5)$$

where the median of a set of motion vectors may be the motion vector with the lowest sum of distances to the other motion vectors in the set. For example, consider each motion vector in the set as a point in the two dimensional space, and calculate the distance between each pair of motion vectors in the set. The median of the set may then be the motion vector whose summation of the distances to other motion vectors is minimal among the motion vectors in the set. Note that in other embodiments, the distance between two motion vectors may be calculated as the Cartesian distance between the two points corresponding to the two motion vectors, or it may be approximated as the sum of the horizontal distance and the vertical distance between the two motion vectors to reduce computing complexity.

Similarly, the predicted motion vectors from PP(n+3) as the reference frame to PP(n) as the target frame is obtained by cascading the motion vectors from MER(n+3, n+2) and MER (n+2, n) where MER(n+3, n+2) is available from the stage 1 of motion estimation and MER(n+2, n) is available from the stage 3 of motion estimation for PP(n+2). Note that this is the reason that motion estimation stages 2 and 3 are required for PP(n+2) to be completed before the stage 2 of PP(n+3). The predicted motion vectors from SR(n−2) to PP(n), and from SR(n−3) and PP(n) can be obtained in similarly as shown in FIG. 5.

In another embodiment of this invention, in predicting the motion vector for R from PP(n+2) to PP(n), the median operator in Equation 5 may be replaced with the arithmetic average of the four motion vectors. In another embodiment, in predicting the motion vector for R from PP(n+2) to PP(n), the minimal SAD between the block T and each of the four blocks Si (i=1, 2, 3, 4) (see FIG. 5) may be used in Equation 5 to replace the median of the four motion vectors. In yet another embodiment of this invention, in predicting the motion vector for R from PP(n+2) to PP(n), one may calculate the SAD corresponding to each of the following four motion vectors: MV(n+2,n+1,x,y)+MV(n+1,n,xi,yi) (i=0,1,2,3), and choose the one with the minimal SAD.

ME stage 3: In the last stage 430 of processing in the motion estimation block, the predicted motion vectors are refined to determine MER(n+k, n) for (k=−3, −2, 2, 3), by searching around the corresponding predicted motion vectors. For example, to determine MER(n+3, n), a block-based motion estimation is performed with a search center at (x+C_MVx(n+3, n), y+C_MVy(n+3, n)) and a search area (search_range_H3, search_range_V3), where search_range_H3 and search_range_V3 are programmable integers representing respectively the horizontal search range and vertical search range. The search range at this stage may be set to be smaller than that in the stage 1 of motion estimation to reduce the computational complexity of motion estimation.

Motion-compensated Back Projection

Subsequent to motion estimation processing, the image PP(n) may be subjected to processing for motion-compensated back projection (MCBP). The inputs to this block are the motion estimation results MER(n+k, n) (k=−3, −2, −1, 1, 2, 3) output from the motion estimation processing block, the corresponding low resolution frames LR(n+k), and the high resolution frame PP(n) from the spatial interpolation processing block. The output from the MCBP processing block is the updated high resolution frame PP(n), denoted as MCBP(n).

Figure 6:
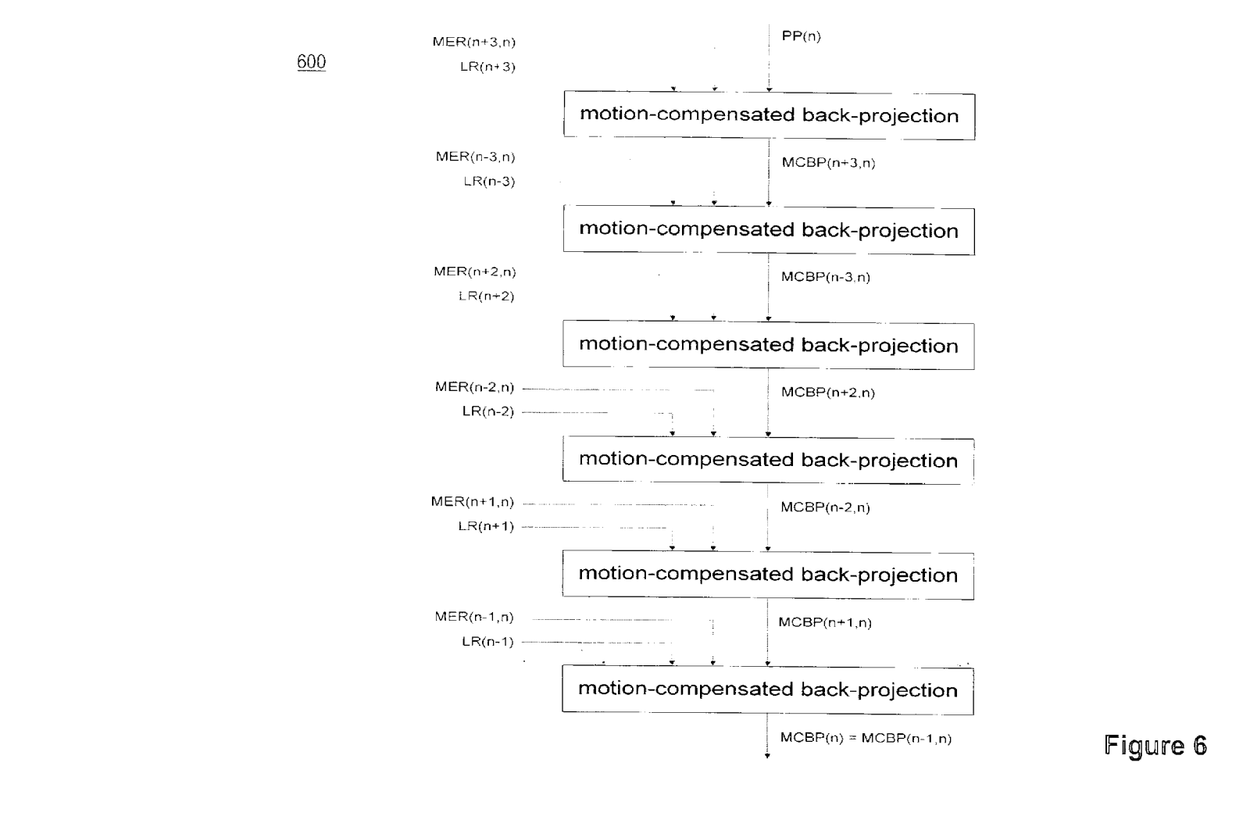
FIG. 6 shows the order of processing images with a processing frame window of 7, in the motion-compensated back projection processing block of FIG. 2.

At frame level, the procedures in this block are performed in the cascaded order shown in FIG. 6. The frame ordering proposed herein, shown in FIG. 6, favors frames that are temporally close to PP(n) over frames further away from PP(n). Temporally close frames are favored because motion estimation is generally more reliable for a pair of frames with a smaller temporal distance than that with a larger temporal distance. Also, this ordering favors the motion estimation results MER(n−k, n) over MER(n+k, n) (k=3, 2, 1), for the reason that SR(n−k), from which MER(n−k, n) is generated, is normally more accurate in terms of closeness to the true scene than PP(n+k), from which MER(n+k, n) is generated.

The first stage in FIG. 6 is used as an example to describe the procedures in the MCBP block. The same procedures are repeated for the other stages. For example, PP(n) an be refined based on LR(n+3) as shown in FIG. 7, according to the following steps:

(1) For each block-grid-aligned block R in PP(n+3), the corresponding motion-compensated block T in PP(n) is found using the motion estimation results MER(n+3, n). For example, if block R is at the position (x, y) in PP(n+3) and its motion vector is (mvx, mvy), the corresponding motion compensated block T is the block at the position (x-mvx, y-mvy) in PP(n).

Figure 7:
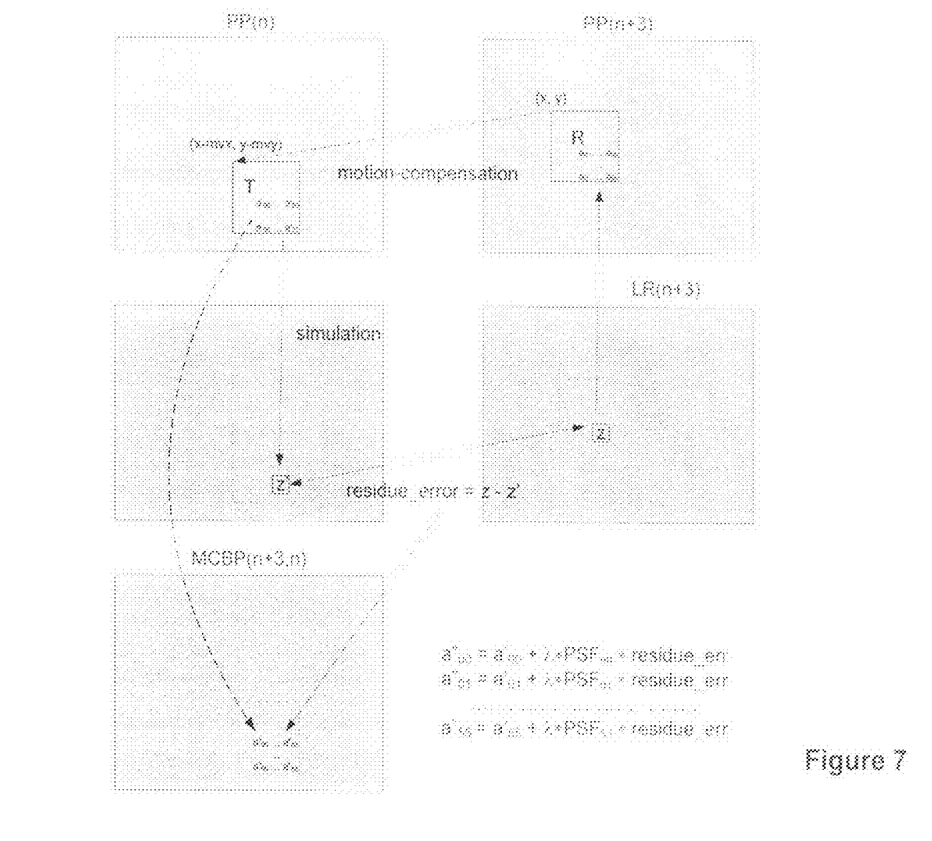
FIG. 7 shows details of some of the processing in motion-compensated back projection in accordance with the present invention.

(2) For each pixel z in the low resolution frame LR(n+3) within the spatial location of block R, the corresponding pixels are identified in block R of PP(n+3) based on a predetermined spatial window, for example, $a'_{00} \ldots a'_{55}$ in FIG. 7, and consequently the corresponding pixels in block T of PP(n), for example, $a'_{00} \ldots a'_{55}$. From the identified pixels in PP(n) a simulated pixel z' corresponding to z is generated. Note that the simulated pixel z' may not necessarily co-site with an existing pixel of LR(n): the pixel z' co-sites with an existing pixel of LR(n) if and only if both mvx and mvy are integers in terms of the resolution of LR(n). For example, in the case of using spatial interpolation to up-scale LR(n) by three both horizontally and vertically, the simulated pixel z' co-sites with an existing pixel of LR(n) if and only mvx % 3=0 and mvy % 3=0.

(3) The residue error between the simulated pixel z' and the observed pixel z is computed, as residue_err=z-z'.

(4) The MCBP(n+3, n) frame is generated by updating the pixels in PP(n), for example, from pixels $a'_{00} \ldots a'_{55}$ in PP(n) to pixels $a''_{00} \ldots a''_{55}$ in MCBP(n+3, n), according to the calculated residue error as shown at the bottom right in FIG. 7.

In step 2 above, to identify the pixels in PP(n) corresponding to the pixel z in LR(n+3) and simulate the pixel z' from these pixels, ideally, the point spread function (PSF) in the image acquisition process is required. Since PSF is generally not available to super-resolution processing and it often varies among video sources, an assumption may be made with regard to the PSF, considering both the required robustness and computational complexity.

For example, a poly-phase down-sampling filter may be used as PSF. The filter may consist, for example, of a 6-tap vertical poly-phase filter and a consequent 6-tap horizontal poly-phase filter. As shown in FIG. 7, the pixel z in LR(n+3) corresponds to the pixels $a_{00}$ to $a_{55}$ in PP(n+3) through the PSF; and the pixels $a_{00}$ to $a_{55}$ correspond to the pixels $a'_{00}$ to $a'_{55}$ in PP(n) through the motion vector (mvx, mvy); therefore, the pixels in PP(n) corresponding to z are $a'_{00}$ to $a'_{55}$ and the simulated pixel z' is:

$$z' = \sum_{i=0}^{5} \sum_{j=0}^{5} PSF_{ij} * a'_{ij} \qquad (6)$$

where $PSF_{ij}$ is the coefficient in the PSF corresponding to $a'_{ij}$. In another embodiment of this invention, a bi-cubic filter may be used as the PSF.

In step 4 above, the residue error is scaled by $\lambda * PSF_{ij}$ and added back to the pixel $a'_{ij}$ in PP(n) to generate the pixel $a''_{ij}$ in MCBP(n+3, n). The purpose of $PSF_{ij}$ is to distribute the residue error to the pixels $a'_{ij}$ in PP(n) according to their respective contributions to the pixel z'. As proposed herein, the purpose of the scaling factor $\lambda$ is to increase the robustness of the algorithm to motion estimation inaccuracy and noise. $\lambda$ may be determined according to the reliability of the motion estimation results for the block R. Let the ME results for the block R be (mvx, mvy, sad, nact). Among the eight immediate neighboring blocks of R in PP(n+3), let sp be the number of blocks whose motion vectors are not different from (mvx, mvy) by 1 pixel (in terms of the high-resolution), both horizontally and vertically. In an embodiment of this invention, $\lambda$ may be determined according to the process shown in FIG. 8.

Figure 8:
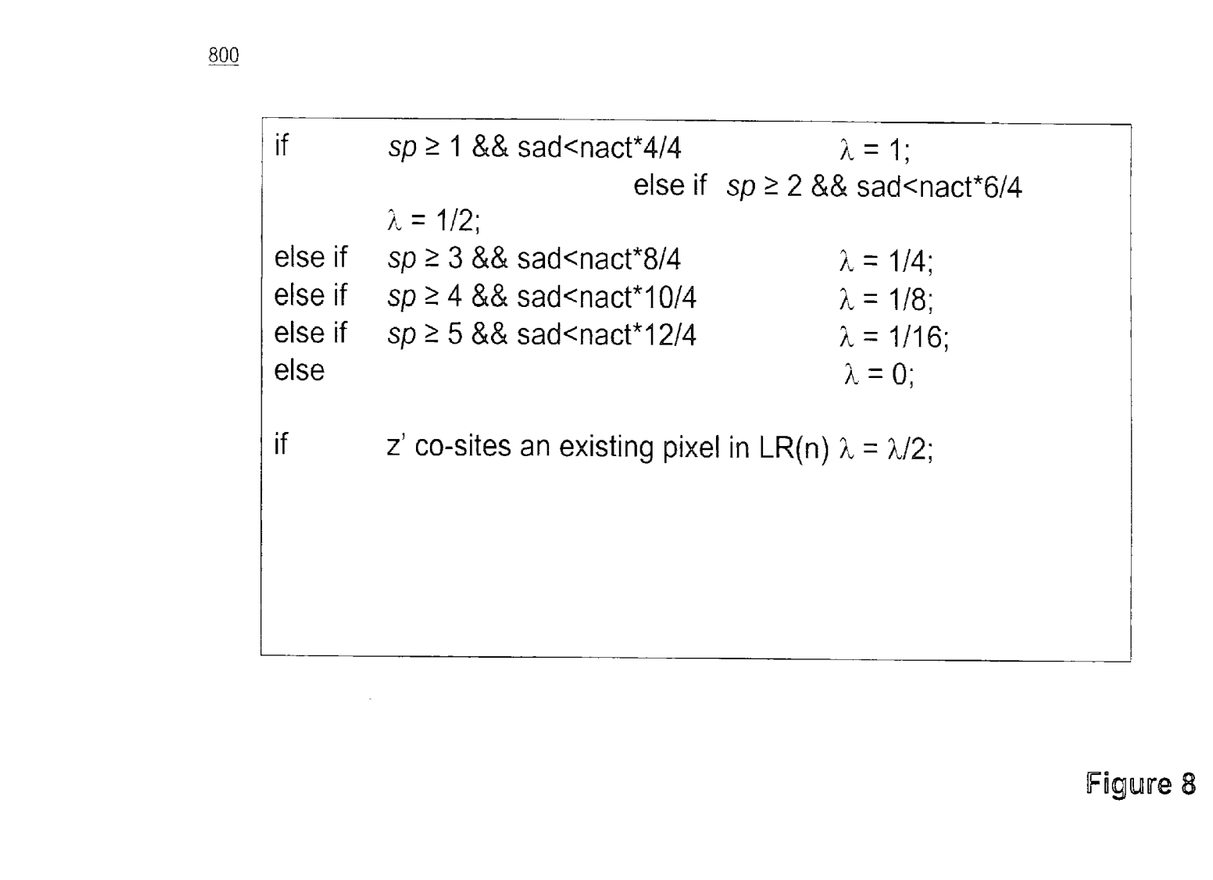
FIG. 8 is a method of computing λ, a measure of detected motion reliability in accordance with the present invention.

FIG. 8 is an illustration conveying that the contribution from the residue error to updating the pixels in PP(n) should be proportional to the reliability of the motion estimation results. This proportionality is measured in teems of motion field smoothness, represented by the variable sp in the neighborhood of R and how good the match is between R and T, for example, as represented by comparison of sad and nact. Note that, in FIG. 7, if the simulated pixel z' co-sites with an existing pixel in LR(n), $\lambda$ is reduced by half, which implies the updating back-projection strength from the residue error is reduced by half. The reason for this is that, in the case that z' co-sites with an existing pixel in LR(n), the pixel z' is a version of the pixel z that is simply shifted an integer number of pixels, and hence it does not provide much additional information in terms of resolution enhancement. However, it may be helpful in reducing the noise in PP(n).

In another embodiment of this invention, in calculating the scaling factor $\lambda$, the reliability of the motion estimation results may be measured using the pixels in PP(n) and PP(n+3) corresponding to the pixel z, i.e., $a_{00} \ldots a_{55}$ in PP(n+3) and $a'_{00} \ldots a'_{55}$ in PP(n). For example, sad and nact in FIG. 8 may be computed from these pixels only instead from all the pixels in R and T.

Motion-free Back Projection

Subsequent to the MCBP processing, the motion free back projection processing block produces the super-resolved frame SR(n). The input to this block is the high resolution frame MCBP(n) from the motion-compensated back-projection block, and the low resolution frame LR(n). The output from this block is the super resolved high resolution frame SR(n).

The procedures in this step are similar to those in motion-compensated back projection described above with two differences: (1) no motion is involved in this stage, and therefore (0, 0) motion vectors are used for all the pixels in LR(n); and (2) the scaling factor $\lambda$ may be set to a constant ($0 \leq \lambda \leq 1$).

Figure 9:
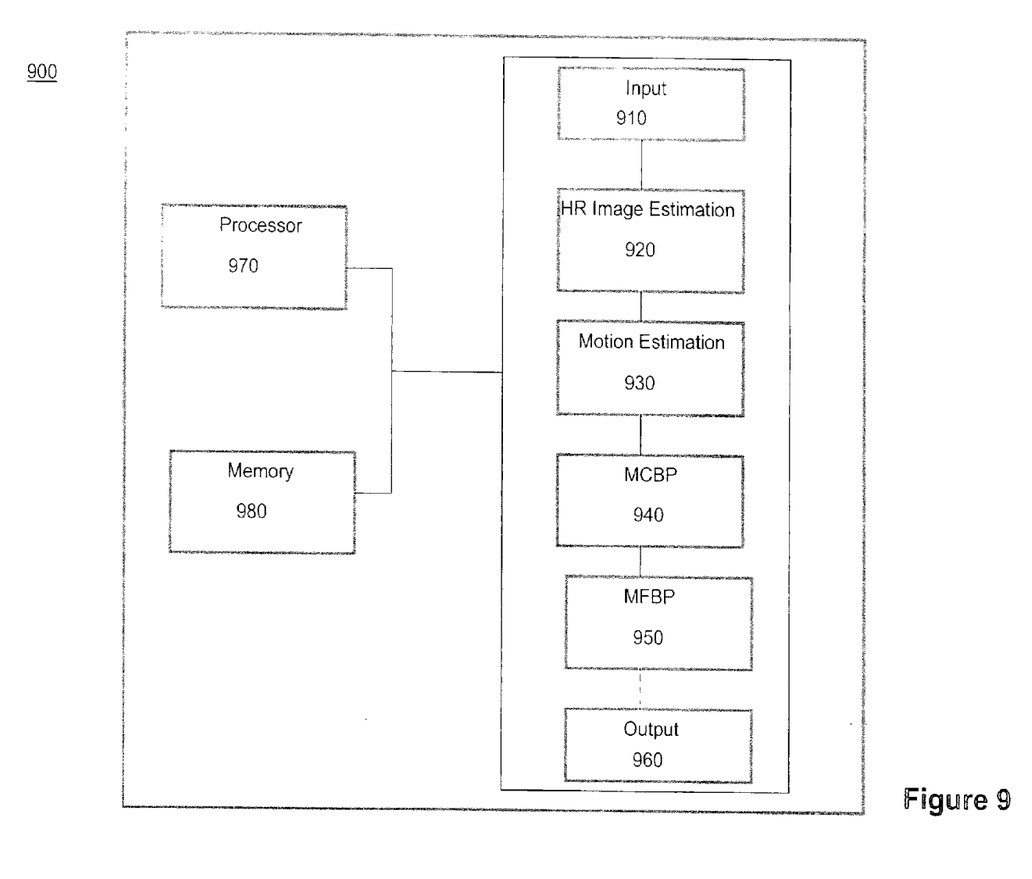
FIG. 9 illustrates the modules in a system according to the present invention.

FIG. 9 is an illustration of an exemplary block diagram of the present invention. In FIG. 9, a system for super-resolution video 900 includes: high resolution image estimation module 920 that generates an initially estimated high resolution image by processing images according to step 210. Also included are a motion estimation module 930 for motion estimation according to step 220, a motion-compensated back propagation module 940 for motion-compensated back projection according to step 230, and a motion-free back propagation module 950 for motion-free back projection according to step 240. A person skilled in the art will understand that the modules 920-950 can be implemented in software, firmware, hardware (such as processors or ASICs which may be manufactured from or using hardware description language coding that has been synthesized), or using any combination thereof. The embodiment may further include a processor 970, a memory 980, an input interface 910 through which the low resolution images are received and an output interface 960 through which the super resolved images are transmitted. Example embodiments of the present invention may include such systems as personal computers, personal digital assistants (PDAs), mobile devices (e.g., multimedia handheld or portable devices), digital televisions, set top boxes, video editing and displaying equipment and the like.

Conclusion

Further embodiments may include methods and systems that convert low resolution still images into high resolution still images. The description of the functionality defined by the present invention to processing of still images into super-resolution still images is similar to the processing of super-resolution video. For example, a sequence of low resolution still images may be converted to corresponding high resolution images in an embodiment of the present invention.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor, and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A non-transitory computer readable medium carrying one or more sequences of one or more instructions for execution by one or more processors to perform a method of generating a super-resolution image using a sequence of low resolution images, the instructions when executed by the one or more processors, cause the one or more processors to:

generate a second estimated high resolution image by motion-compensated back projecting a first estimated high resolution image using motion estimation results between said first estimated high resolution image and a plurality of high resolution comparison images derived from the sequence of low resolution images, wherein the motion estimation results are generated by a method comprising:

temporally sequencing a first working sequence including a first set of comparison images from the plurality of high resolution comparison images, a second set of comparison images from the plurality of high resolution comparison images, and the first estimated high resolution image, wherein each image in the first set of comparison images is derived from a respective low resolution image occurring before the first low resolution image in the sequence of low resolution images, and wherein each image in the second set of comparison images is derived from a respective low resolution image occurring after the first low resolution image in the sequence of low resolution images;

computing motion vectors between each pair of neighboring images from the first working sequence, between each pair of neighboring images from the second working sequence, between the first estimated high resolution image and an image from the first working sequence, and between the first estimated high resolution image and an image from the second working sequence;

generating a set of estimated motion vectors between the first estimated high resolution image and images in the first working sequence and the second working sequence, wherein the set of estimated motion vectors is generated by combining the computed motion vectors; and refining the estimated motion vectors; and generate the super-resolution image by motion-free back projecting the second estimated high resolution image.

2. The non-transitory computer readable medium of claim 1, wherein combining motion vectors created in computing motion vectors between each pair of neighboring images, further comprises:

identifying a first block in a first reference frame, wherein the first block is grid aligned in the first reference frame;

identifying a second block in an intermediate frame, wherein the second block is a best matching block of the first block;

identifying a plurality of third blocks in a target frame, wherein the second block contains pixels from each third block, and wherein each third block is block aligned in the target frame; and computing a value representative of the plurality of third blocks.

3. The non-transitory computer readable medium of claim 2, wherein the value representative of the plurality of third blocks is a median of the motion vectors between the plurality of third blocks and the second block.

4. The non-transitory computer readable medium of claim 2, wherein the value representative of the plurality of third blocks is a arithmetic average of the motion vectors between the plurality of third blocks and the second block.

5. The non-transitory computer readable medium of claim 2, wherein the value representative of the plurality of third blocks is a minimum sum of absolute differences of the motion vectors between the plurality of third blocks and the second block.

6. A method to generate a super-resolution image using a sequence of low resolution images, the method comprising:

motion estimating between a first estimated high resolution image and a plurality of high resolution comparison images derived from a sequence of low resolution images, generating a plurality of motion estimation results, wherein the first estimated high resolution image corresponds to a first low resolution image selected from the sequence of low resolution images, and wherein the plurality of high resolution comparison images comprise one or more previously generated super-resolution images and one or more intermediate high resolution images, wherein the one or more previously generated super-resolution images are derived from respective low resolution images occurring before the first low resolution image, and wherein the one or more intermediate high resolution images are derived from respective low resolution images occurring after the first low resolution image;

motion-compensated back projecting the first estimated high resolution image using said motion estimation results to generate a second estimated high resolution image; and motion-free back projecting the second estimated high resolution image to produce the super-resolution image.

7. A system for generating super-resolution images, comprising:

a high resolution image estimation module configured to derive a first estimated high resolution image and a plurality of high resolution comparison images from a sequence of low resolution images, wherein the first estimated high resolution image corresponds to a first low resolution image selected from the sequence of low resolution images, and wherein the plurality of high resolution comparison images comprise one or more previously generated super-resolution images and one or more intermediate high resolution images, wherein the one or more previously generated super resolution images are derived from respective low resolution images occurring before the first low resolution image, and wherein the one more intermediate high resolution images are derived from respective low resolution images occurring after the first low resolution image;

a motion estimating module configured to motion estimate between a first estimated high resolution image and the plurality of high resolution comparison images, generating a plurality of motion estimation results;

a motion-compensated back projection module configured to motion-compensated back project the first estimated high resolution image using said motion estimation results to generate a second estimated high resolution image; and a motion-free back projection module configured to motion-free back project the second estimated high resolution image to produce a first super resolved the super-resolution image.

8. A non-transitory computer readable medium curving one or more sequence of one or more instructions for execution by one or more processors to perform a method of generating a super-resolution image using a sequence of low resolution images, the instructions when executed by the one or more processors, cause the one or more processors to:

generate a second estimated high resolution image by motion-compensated back projecting a first estimated high resolution image using motion estimation results between said first estimated high resolution image and a plurality of high resolution comparison images derived from the sequence of low resolution images, wherein the first estimated high resolution image corresponds to a first low resolution image selected from the sequence of low resolution images, and wherein the plurality of high resolution comparison images comprise one or more previously generated super-resolution images and one or more intermediate high resolution images, wherein the one or more previously generated super-resolution images are derived from respective low resolution images occurring before the first low resolution image, and wherein the one or more intermediate high resolution images are derived from respective low resolution images occurring after the first low resolution image; and generate the super-resolution image by motion-free back projecting the second estimated high resolution image.

9. The non-transitory computer readable medium of claim 8, wherein the one or more previously generated super-resolution images have been generated using at least one of motion compensated back propagation and motion free back propagation.

10. The non-transitory computer readable medium of claim 8, wherein the sequence of low resolution images are video images.

11. The non-transitory computer readable medium of claim 8, wherein motion-compensated back projecting includes refining the first estimated high resolution image according to a plurality of reference images, wherein the reference images are ordered from temporally furthest to temporally closest to the first estimated high resolution image.

12. The non-transitory computer readable medium of claim 11, wherein the reference images with the same temporal distance to the first estimated high resolution image are processed in order of temporal precedence.

13. The non-transitory computer readable medium of claim 12, wherein motion-compensated back projecting further includes scaling a residue error of motion compensation by a scaling factor.

14. The non-transitory computer readable medium of claim 13, wherein the scaling factor is determined by the reliability of the plurality of motion estimation results.

* * * * *

UNITED STATES PATENT AND TRADEMARK OFFICE
CERTIFICATE OF CORRECTION

PATENT NO. : 8,306,121 B2
APPLICATION NO. : 12/076347
DATED : November 6, 2012
INVENTOR(S) : Yunwei Jia Page 1 of 1

It is certified that error appears in the above-identified patent and that said Letters Patent is hereby corrected as shown below:

Column 13
Line 45, Claim 4, please replace "a" with --an--.

Column 14
Line 25, Claim 7, please replace "one more" with --one or more--.

Column 14
Line 41, Claim 8, please replace "curving" with --carrying--.

Column 14
Line 42, Claim 8, please replace "sequence" with --sequences--.

Signed and Sealed this
Eighth Day of January, 2013

David J. Kappos
*Director of the United States Patent and Trademark Office*